US010592835B2

(12) United States Patent
Ben-Bassat et al.

(10) Patent No.: US 10,592,835 B2
(45) Date of Patent: *Mar. 17, 2020

(54) METHOD AND SYSTEM FOR MANAGING AN EFFICIENT PRODUCTION FLOOR, VIA THE INTERNET OF THINGS

(71) Applicant: Plataine Ltd., Petach Tikva (IL)

(72) Inventors: Moshe Ben-Bassat, Tzur Moshe (IL); Avner Ben-Bassat, Even Yehuda (IL); Eduard Goldner, Tel-Aviv (IL); Naaman Lifshitz, Kiryat Ono (IL); Michal Diga, Petach Tikva (IL)

(73) Assignee: Plataine Ltd, Azorim Park Petach Tikva (IL)

( * ) Notice: Subject to any disclaimer, the term of this patent is extended or adjusted under 35 U.S.C. 154(b) by 69 days.

This patent is subject to a terminal disclaimer.

(21) Appl. No.: 15/671,159

(22) Filed: Aug. 8, 2017

(65) Prior Publication Data

US 2019/0034850 A1    Jan. 31, 2019

Related U.S. Application Data

(63) Continuation of application No. 15/041,036, filed on Feb. 11, 2016, now Pat. No. 9,740,896.

(Continued)

(51) Int. Cl.
*G06Q 90/00* (2006.01)
*G06Q 10/06* (2012.01)
(Continued)

(52) U.S. Cl.
CPC ... *G06Q 10/06313* (2013.01); *G06K 7/10366* (2013.01); *G06K 7/1413* (2013.01);
(Continued)

(58) Field of Classification Search
CPC ....... G06Q 10/087; G06Q 10/00; G06Q 10/08
(Continued)

(56) References Cited

U.S. PATENT DOCUMENTS 7,327,262 B2    2/2008 Motteram et al.

OTHER PUBLICATIONS

Brizzi P et al: "Bringing the Internet of Things along the manufacturing line: A case study in controlling industrial robot and monitoring energy consumption remotely",2013 IEEE 18th Conference on Emerging Technologies & Factory Automation (ETFA),IEEE,Sep. 10, 2013 (Sep. 10, 2013), pp. 1-8, XP032516979 ISSN: 1946-0740, DOI:I0.1109/ETFA.2013.6647947.

(Continued)

*Primary Examiner* — Jamara A Franklin
(74) *Attorney, Agent, or Firm* — Naomi Rosenman-Helfand

(57) ABSTRACT

The invention discloses a computerized method for planning and monitoring an efficient production floor. A production site is provided with communication access to a central server configured to: receive input data comprising details a planned job run of the production floor; receive status and location parameters pertaining to tagged central key assets of a production floor, from tracking readers located in the production site; compare the para meters to preconfigured rules using a context analyzing component; output decisions based on the comparison; the decisions resulting in generating alerts and/or recommendations pertaining to the para meters of the key assets, communicate the alerts, and/or recommendations, digitally to specified personnel; these alerts and/or recommendations related to flow of the production floor. A system of the invention is also disclosed.

43 Claims, 6 Drawing Sheets

Related U.S. Application Data

(60) Provisional application No. 62/116,446, filed on Feb. 15, 2015.

(51) Int. Cl.
  *G06K 7/10* (2006.01)
  *G06K 7/14* (2006.01)
  *G08B 21/18* (2006.01)
  *G06Q 10/08* (2012.01)
  *G06Q 10/00* (2012.01)
  *G06N 5/02* (2006.01)

(52) U.S. Cl.
  CPC .......... *G06Q 10/087* (2013.01); *G06Q 10/20* (2013.01); *G08B 21/182* (2013.01); *G06K 7/10297* (2013.01); *G06K 7/10445* (2013.01); *G06N 5/027* (2013.01)

(58) Field of Classification Search
  USPC ................................................ 235/376, 385
  See application file for complete search history.

(56) References Cited

OTHER PUBLICATIONS

Yuan Lidyin et al: "The Research on Monitoring of Discrete Manufacturing Process Based on Internet of Things", 2013 IEEE International Conference on Green Computing and Communications and IEEE Internet of Things and IEEE Cyber, Physical and Social Computing,IEEE (Aug. 20, 2013), pp. 1186-1191, XP032530915 DOI: 10.1109/greencom-ithings-cpscom.2013.206.

Liu Jihong et al: "Technical State Monitoring and Evaluation of Aerospace Product Manufacturing Workshop Based on Internet of Things", 2013 IEEE International Conference on Green Computing and Communications and IEEE Internet of Things and IEEE Cyber, Physical and Social Computing, IEEE,(Aug. 20, 2013), pp. 1197-1201, XP032530891 DOI:10.1109/greencom-ithings-cpscom.2013208.

Stamatis Kamouskos et al: "Towards the Real-Time Enterprise: Service-based Integration of Heterogeneous SOA-ready Industrial Devices with Enterprise Applications", Proceedings of the 13th IFAC Symposium on Information Control Problems in Manufacturing (INCOM), Moscow, Russia, Jun. 8, 2009 (Jun. 8, 2009), pp. 2127-2132, XP002566405.

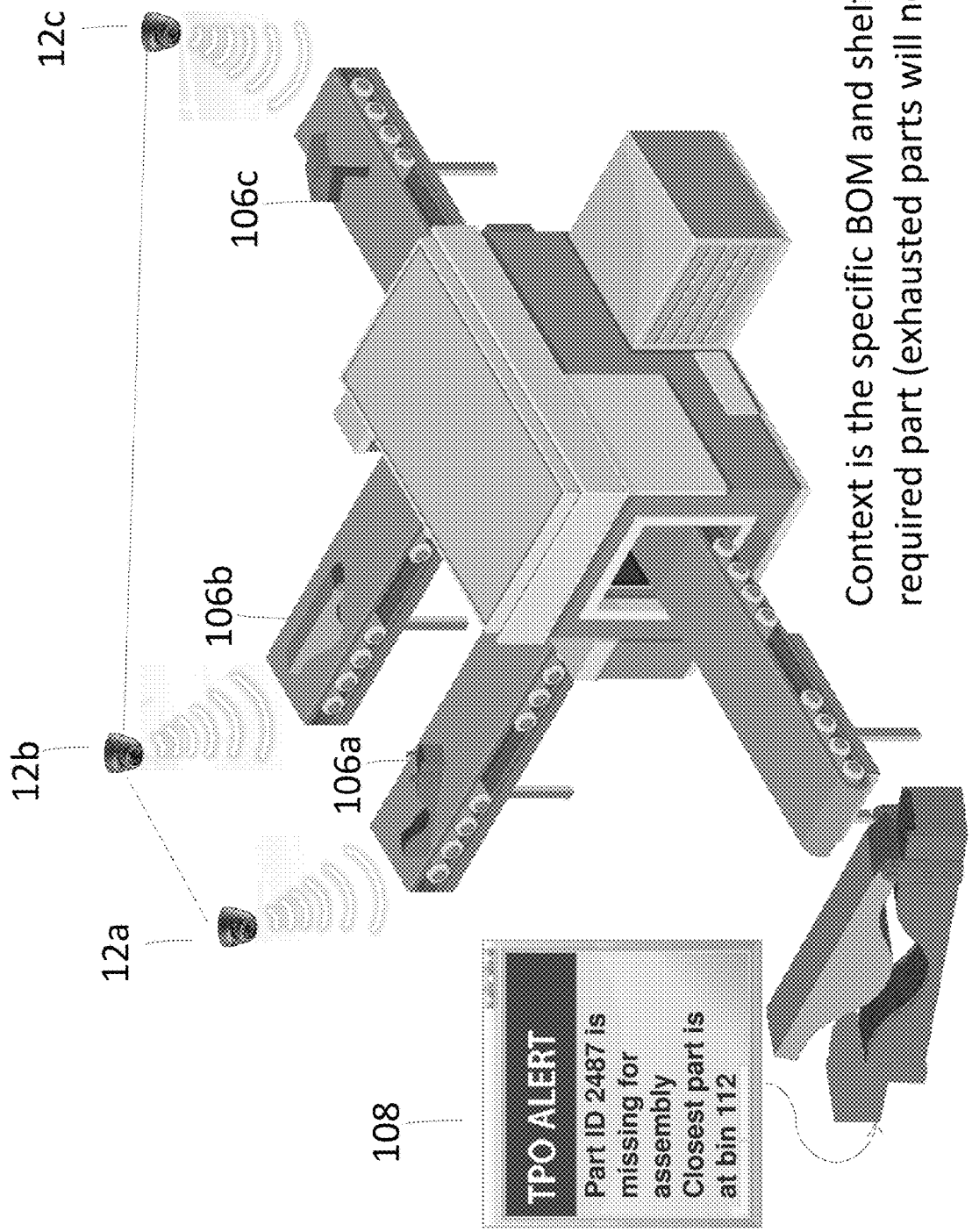

METHOD AND SYSTEM FOR MANAGING AN EFFICIENT PRODUCTION FLOOR, VIA THE INTERNET OF THINGS

FIELD OF THE INVENTION

The invention pertains to computer software for tracking the status of key assets that are electronically tagged, on a production floor. The software includes optimization software algorithms, which are applied to the collected data in order improve production efficiencies. The software produces production floor decisions.

Non-limiting examples of tracked assets are time-sensitive and temperature-sensitive materials, such as composite materials based on carbon fiber reinforced polymers (CFRP), utilized for instance in the aircraft industry. Additional assets which may be may be tagged and tracked, are key tools, assemblies, and Work In Process (WIP) inventory. Tagging may be done using RFID, near field communication, barcodes, etc.

Among other capabilities, the software ensures expiry dates and time constraints are observed for a multitude of materials that are in use or in stock, at a single instance on a production floor, ensuring safety of the final product with minimal waste of material. A system is also described which is based on this software.

BACKGROUND OF THE INVENTION

In manufacture of components for the airplane, automotive, shipbuilding and other industries, carbon composite materials (e.g. CFRP) are typically stored in industrial freezers prior to use. Once a unit of material is defrosted for use, it must reach the manufacturing stage of curing within a set time, termed the ETL (exposure time left), or it will deteriorate in quality and be deemed unsafe for use. At any given time, a multitude of units of material will be in use on a production floor, with each unit having a different ETL, since the units may originate from various rolls of "parent" material. Additionally, the units are temperature sensitive, so that the temperature of each unit must be monitored and fluctuations in temperature must be avoided.

It is difficult at present to keep track of the various expiration dates of materials on the production floor and in stock, and there is no way to receive real-time notification of the status of the materials or of central equipment. There may be numerous tools and equipment in use on a production floor, making it difficult to track their location and condition. Prior art software may monitor the contents of a stockroom in a general manner, and may generate reminders to reorder dwindling stock, however it does not provide warning of "close to expiry" stock, and does not include any decision making component which provides problem solving.

It would be desirable to provide a production floor manager with a calculated decision as to specific units of materials which are suited for immediate use in producing a specific final component. Suitable software would take into consideration the quantity of materials necessary for the job, the closest expiry date of materials in stock, and would automatically monitor the well-being of the material from its entry to the factory until it is deemed no longer sensitive to the environment.

To date, quality assurance tests are performed at the end of manufacture of a specific complex component. If the equipment is faulty at a central production station, this will not be discovered until a much later date, when the final component fails to pass a quality assurance test. It may then be difficult to pinpoint the exact equipment that failed, resulting in waste of a large quantity of unusable components that were manufactured in the meantime until testing of all equipment was complete.

It is desirable to be able to track the passage of tagged materials through the various productions stations, and identify which equipment is used on which batch of material. It would be advantageous to receive warnings when routine maintenance is due for each specific tool, with warnings directed to the appropriate employee. These steps will prevent loss of material which can be highly costly and can delay delivery of the final product.

It would also be advantageous to track materials in real-time, receive real-time updates when equipment is available and thus plan maximal efficiency of the production floor.

While prior art tagging is known for monitoring and data communication with robots or machinery, the present invention provides tagging and monitoring mobile assets such as raw material and assemblies. While prior art manufacturing execution systems (MES) may exist for monitoring work orders, these do not typically track 'mobile assets' such as raw materials available, or in use, for a given work order. In addition, such MES systems are limited to tracking work orders, but do not incorporate algorithms that could make production decisions or could make recommendations based on the data collected.

The invention provides a computerized method and system for efficiently managing a production floor, including monitoring and best use of materials sensitive to the environment. The invention takes into account the context of each asset being tracked, so that it determines if a given location and state of an asset is within an allowable range, and outputs a decision how best to proceed. The decision is sent as an alert or recommendation, generated to relevant personnel. These and other advantages will be enlarged upon in the Detailed Description of the Invention herein-below.

While the invention is described below in relation to its use in tracking manufacture of aircraft components, this is merely a common example, and the software may be utilized to track manufacture of any article. The software may be utilized to plan efficient production of any item, by tracking progress of tagged key assets through the production floor.

SUMMARY OF THE INVENTION

In the present invention, the term "input data" in reference to a planned job run of a production floor, refers to details of a product required to be made. These details may include the following non-limiting examples: orders, quantities and due dates from ERP; design files received from a PLM system, and any restrictions which may exist for a cut-plan, the bill of material (BOM) (including specifics of the raw materials, sub-assemblies, parts and their quantities to manufacture an end product). The PLM additionally inputs the bill of process (BOP), which includes a list of processes to be executed to manufacture the desired end product. In addition, the "Input data" includes the data collected on the production floor by the sensors tagged to the various assets.

In the present invention, the term "key assets", used in reference to tagged and tracked items, refers to articles and personnel deemed central to the operation of a production floor. Non-limiting examples include: materials or components central to a produced article; time-sensitive and temperature-sensitive materials, such as composite materials based on carbon fiber reinforced polymers (CFRP), utilized for instance in the aircraft industry. Additional assets which may be may be tagged and tracked, are key tools, assemblies, Work in Process Inventory (WIP) and key personnel.

In the present invention, the term "production site" refers to an area in the vicinity of a production floor.

In the present invention, the term "alert" refers to a notification of the status of a key asset or of the production floor, and the alert is communicated to relevant personnel. Non-limiting examples of alerts may be: a harmful temperature fluctuation is sensed; or material X is due to expire shortly. The alert may also include a decision, which has been produced by the novel decision making component of the invention.

The term "decision" in the present invention, as produced by the decision making component of the software, refers to an automated calculated directive for optimizing the process flow on a production floor, and for optimizing use of materials and of key assets. Non-limiting examples of decisions would be: consume unit X of material in job Y, thus preventing expiry of the material; and schedule job Y before job Z. A decision may be considered fully automatic, as it is carried out by the software based on input received, context awareness components and rule engines; human personnel are not queried for their input before a production flow decision is made.

The term "recommendation" as used in the present invention, refers to a suggestion made by the software, for optimizing the flow of material and efficiency of the production floor; the recommendation typically requires approval of predefined personnel before it is carried out on the production floor. A recommendation is therefore considered semi-automatic.

The invention discloses a computer based method for planning and monitoring an efficient production floor, the method comprising providing a production site with communication access to a central server configured to:
receive input data comprising details at least one planned job run of the production floor;
receive status and location parameters pertaining to tagged central key assets of the production floor, from tracking readers located in the production site;
compare the parameters to preconfigured rules using a context analyzing component;
output decisions based on the comparison; the decisions resulting in generating at least one of: alerts and recommendations, pertaining to the key assets, and to the job run;
communicate the alerts and recommendations digitally to specified personnel, the alerts and recommendations related to flow of the production floor.

Optionally, the tagged central key assets are selected from at least one of: raw materials, key tools, assemblies, work in process (WIP) inventory; and key personnel.

In some embodiments, the tagged central key assets are tagged using at least one of: a passive RFID tag, an active RFID tag, a battery assisted RFID tag, near field communication, and a barcode; and the tracking reader is appropriate to the tag utilized.

In some cases, the tag comprises a temperature, humidity or pressure sensor for tracking materials sensitive to the environment.

Preferably, the status and location parameters are saved in a database. Additionally, the decisions outputted and the alerts and recommendations communicated may be saved in a database.

Moreover, in some instances, the key asset is a raw material, and the status parameter comprises at least one of the following parameters of the raw material: size (width and/or length), weight, an expiration date, an exposure time left (ETL), and a temperature of the raw material. In such case, the key asset may be one of the following group: a carbon fiber reinforced polymer material; a resin; a metal-powder; a container; and a material used in production.

In a further embodiment, the alerts are related to a material used on the production floor and are selected from: an alert for close to expiry date of raw material; and an alert for exposure time left (ETL) for a raw material.

Moreover, the recommendation may be selected from: a recommendation to order a material; a recommendation to use a specific unit of material; a recommendation for maintenance due; and a recommendation to halt a failed production run.

In other cases, the alerts may be selected from: an alert for temperature out of acceptable range; an alert for an asset in improper location; an alert for equipment failure; an alert of efficiency below a predefined expected value; an alert for equipment unavailable; an alert for detection of a link between a failed production run and a specific employee or a specific tool; and an alert that a job is financially inadvisable to be performed.

Furthermore, certain alerts and recommendations may be predefined to be returned to the server as input data for improving efficiency of a future production run.

Optionally, the server is additionally configured to generate an efficiency report on production runs performed.

In some instances, the alerts and recommendations are communicated digitally to an electronic device having a display, the device selected from: a handheld device, a mounted display, and a wearable device. The server may then additionally receive input from the electronic devices utilized by personnel, the input comprising at least one of: status and location parameters, and an alert, and the input is utilized to output a decision.

In some embodiments, the context analyzer comprises a rule engine and a decision making component.

In one embodiment, the invention further comprises an optimizer component, for calculating and scheduling efficient use of central production stations and of materials, and the alert comprises a production floor plan schedule for a planned job run.

In some instances, the optimizer comprises one or more of the following: a cutting plan optimize for planning initial cutting of material; a material-selection optimizer for selecting the optimal material from storage; an assembly optimizer for detecting optimal parameters of organizing an assembly; and a tool optimizer for planning most efficient use of equipment.

The invention also provides a computerized system for planning and monitoring an efficient production floor, the system comprising:
an input interface configured to receive input data comprising details at least one planned job run of the production floor;
a processing unit operatively connected to the input interface;
a storage unit operatively connected to the processing unit to store the input data; the storage unit also containing instructions that when executed by the processing unit cause the processing unit to:
receive status and location parameters pertaining to tagged central key assets of a production floor, from tracking readers located in the production site;
compare the parameters to preconfigured rules using a context analyzing component;

output decisions based on the comparison; the decisions resulting in generating at least one of: alerts and recommendations, pertaining to the parameters of the key assets;

communicate the alerts and recommendations digitally to specified personnel, the alerts and recommendations related to flow of the production floor.

There is also provided non-transitory machine readable storage medium containing instructions associated with planning and monitoring an efficient production floor; the instructions when executed cause the following:

receive input data comprising details at least one planned job run of the production floor;

receive status and location parameters pertaining to tagged central key assets of a production floor, from tracking readers located in the production site;

compare the parameters to preconfigured rules using a context analyzing component;

output decisions based on the comparison; the decisions resulting in generating at least one of: alerts and recommendations, pertaining to the parameters of the key assets;

communicate the alerts and recommendations digitally to specified personnel, the alerts and recommendations related to flow of the production floor.

BRIEF DESCRIPTION OF THE DRAWINGS

The present invention is illustrated by way of example in the figures of the accompanying drawings, in which like references indicate similar elements and in which:

FIG. 6 illustrates tracking and assessing the condition of specific components in real-time on a production floor, using RFID tags read by wall-mounted RFID readers.

DETAILED DESCRIPTION OF THE INVENTION

Figure 1:
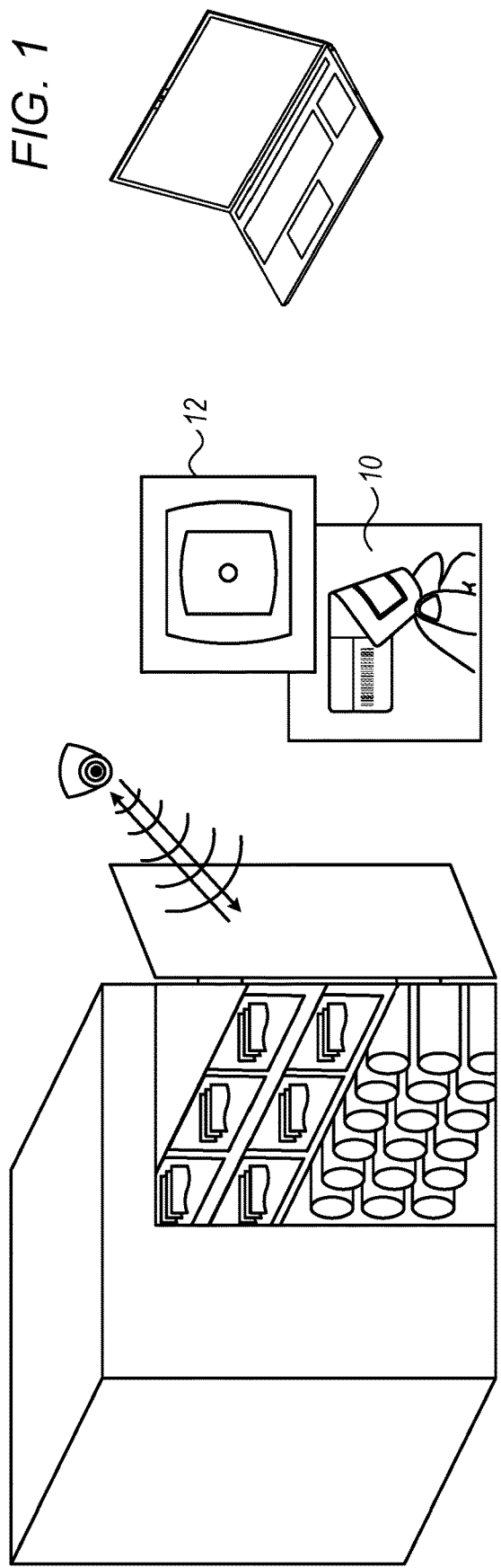
FIG. 1 shows a general overview of some central components of the invention, including units of material tagged with RFID tags, and details of shelf-life of the material saved in a database, and the optimization and alerting process around material selection and allocation.

In the following detailed description, numerous specific details are set forth in order to provide a thorough understanding of the present invention. There is no intention to limit the invention to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

In a general overview, the software of the invention tracks the location and status of temperature-sensitive and time-sensitive materials in real-time, within a predefined location (and throughout a supply chain), such as from arrival at the factory, until use in the production floor. Tracking relies on tagging of central assets (such as materials, central tools, Assemblies, Work In Process (WIP) Inventory, and even key personnel) using RFID, near field communication, temperature sensors, barcodes or the like.

The software includes context awareness: not only is data collected on the location and temperature of key assets, such as specific sensitive units of material, rather the software applies predefined rules, to test if the measured values and locations are within allowable parameters, and within optimal production efficiency. If a detrimental deviation in the parameters is detected, such as a material is not in its proper location, an alert is generated and sent to the proper personnel. The software thus includes novel alerting and decision making components.

In contrast, prior art software may collect data but typically relies on a human operator to continually check that all parameters are acceptable, which can be a complex and daunting task.

For example, the software of the invention determines which materials are sufficient for use in specific jobs, and which have the shortest shelf life. Alerts are sent to predefined relevant employees, such as to a factory worker to use a specific roll of material, and to a clerk to order a depleted material.

Alerts are immediately sent to workers when a harmful temperature fluctuation is sensed, and any material deemed to be harmed is removed immediately from the production floor. Routine maintenance reminders may be sent to specific personnel. Employees may receive alerts on wearable devices having displays, or on handheld electronic devices (such as tablets or cellular phones).

The software additionally includes planning components for scheduling efficient use of equipment and jobs scheduled. The software utilizes distinct rules to determine which equipment should best be used on which jobs. The software schedules and releases jobs to production, based on the availability of materials and tools. The software plans and monitors tool maintenance cycles, and optimally allocates materials, machines and tools to specific jobs.

Efficiency reports and production floor tracking reports are generated for review by management. These may highlight specific bottlenecks or equipment failure. If efficiency falls below a predefined expected value, the source may be pinpointed by the algorithms of the invention.

In the description below, use of the method and system of the invention is described in relation to manufacture of components for the aircraft industry, which utilize temperature-sensitive materials such as carbon fiber reinforced polymers (CFRP), having a limited shelf-life prior to their use. The invention is not limited to use with this or similar materials, but rather can be used to track progress and status of any production process through a production floor.

Referring now to FIG. 1, a unit of sensitive material entering the factory is tagged with an RFID tag 10 which can be read by a wall-mounted reader 12. The RFID tag 10 includes a temperature sensor, as well as a Roll/Kit ID 14 which is associated with vital shelf-life information shown in table 1. ID characteristics are saved in a database, and include the material type 16, location freezer 18, temp sensed at present 20, roll length 22, remaining out time 24 (allowable time remaining after removal from freezer and prior to deterioration); and expiration date 26.

The RFID tag 10 may be passive, active or battery-assisted passive.

The software has detected that Roll #4698 has a short shelf life of 20 hours remaining and has generated two Alerts 28 and 30, sent to a specific employee to utilize this roll for a specific suitable upcoming job on the production floor.

Figure 2:
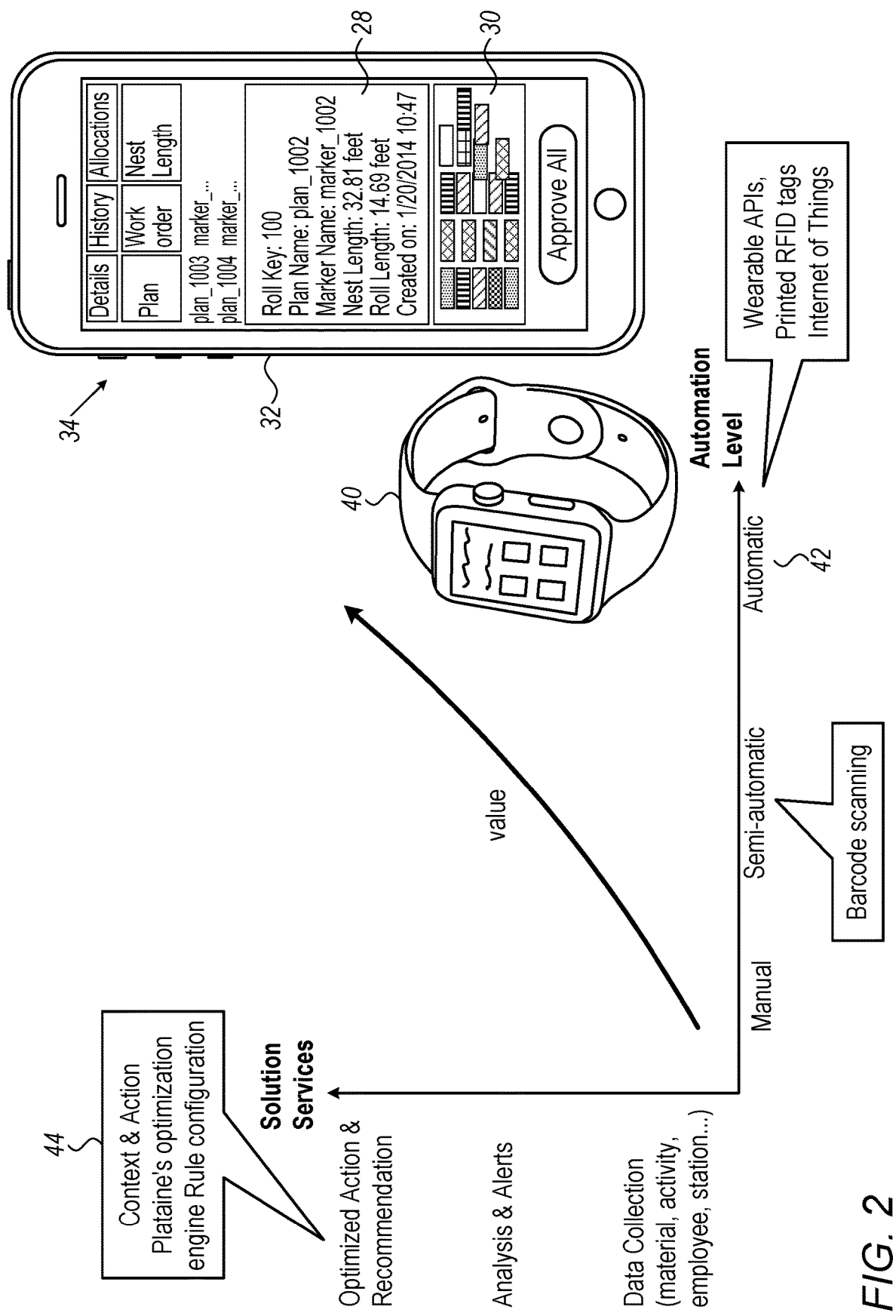
FIG. 2 illustrates alerts received by an employee on a wearable or handheld electronic device.

Referring to FIG. 2, the specified employee 32 has received alerts 28 and 30 to his cellular phone 34 along with details of a suitable production plan 36, and his approval is requested by pressing on an "approve all" button 38. The bulk of the decisions related to this job run have thus been made by the software.

Alternatively, the specified employee 32 may view alerts on a wearable electronic communication device 40 which resembles a wristwatch. Alerts may also be sent to an overhead display (not shown) mounted in view of relevant employees.

The RFID tags are monitored constantly, and the software operates and is updated constantly in real-time with the status of all key assets (vital items and equipment) on the production floor. The system is therefore considered to be automatic 42. This is in contrast to prior art software, where data needed to be constantly entered manually and thus reporting was never in real-time, as was subject to errors or omissions in data entry.

Similarly, the software of the invention notes the context 44 of the data, and compares the data to preconfigured rules 44. For example, if a rise in temperature is sensed for a specific roll of composite material, this is allowable if it is in use on the production floor, yet will generate an alert if the material is indicated in the database as being currently in storage. The action taken is determined by a rule engine, described herein-below. This is in contrast to prior art software, where data collection may occur, however a human operator must take note of any discrepancies and must make most or all of the decisions.

Figure 3:
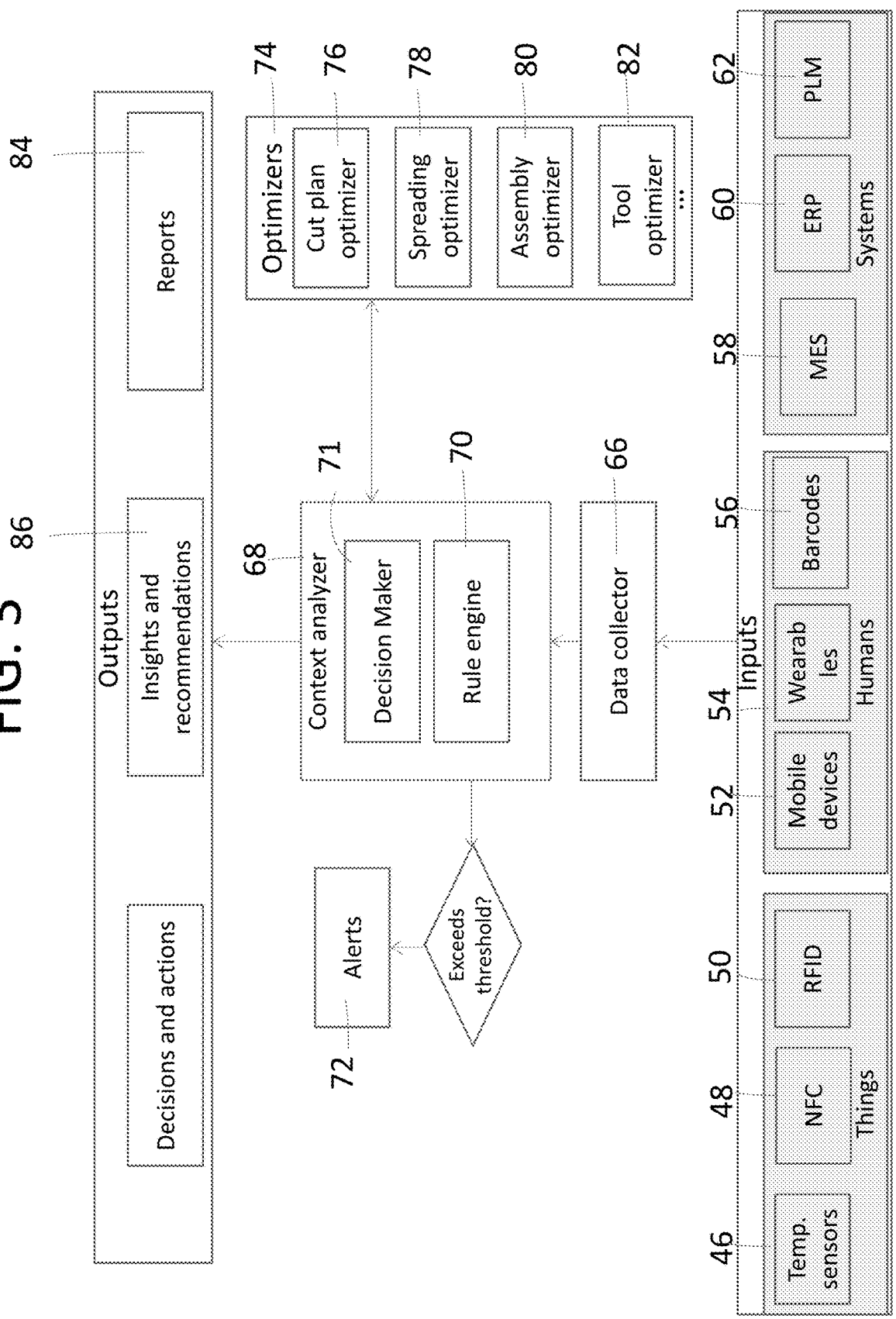
FIG. 3 is a flowchart of the process flow in the invention.

Referring now to FIG. 3, a flowchart is shown of the process flow in the invention.

Input data is accumulated by appropriate hardware readers (not shown) from temperature sensors 46, barcodes 56, RFID tags 50 or near field communication tags 48. Additional data or instructions may be received from mobile devices 52 or wearable devices 54 worn by key employees on the production floor or in management positions. Input data may be received from MES (manufacturing execution systems) 58 such as process steps remaining to be executed, and a list of process steps completed.

Input data may be received from ERP 60, including orders, quantities and due dates.

When planning future jobs, the latest design files are received from the PLM system 62. The PLM 62 provides the software of the invention with input of any restrictions which may exist for a cut-plan, for the bill of material (BOM) (including specifics of the raw materials, sub-assemblies, parts and their quantities to manufacture an end product). The PLM additionally inputs the bill of process (BOP), which includes the list of processes to be executed to manufacture the desired end product.

Details of future jobs and available equipment are sent from the MES 58 as part of the data input.

The various input data 46-62 is sent wirelessly to a data collector 66 and stored in a database.

The context analyzer 68 utilizes a rule engine 70 and a decision maker 71 to determine if the data received is within acceptable ranges or whether warning alerts 72 need to be generated (e.g. inventory depleted, inadvertent temp. rise, equipment unavailable, etc.). A warning alert may be generated to indicate an additional tool should be utilized to provide an intelligent context aware decision.

Alerts 72 and recommendations may be sent to various employees, and may also be sent to management officials.

A production job description is sent to the optimizer components 74 to calculate and schedule the most efficient use of each of central production stations and the materials involved: a cutting plan optimizer 76 for planning initial cutting of the material, a spreading optimizer 78 for spreading resin (e.g. in wet layup), an assembly optimizer 80 for detecting optimal parameters of organizing the assembly, and a tool optimizer 82 for most efficient use of equipment. Optionally, a material-selection optimizer may be used for selecting the optimal material from storage. Additional optimizers may be included as well.

If data is not within the acceptable ranges, such as a report 84 is received from the production floor of inadvertent waste of a material due to human error or mechanical failure, the context analyzer 68 will output a recommendation 86 such as "send machine for repair", or may change the execution plan for the next production run. Additionally, certain alerts or actions may be defined to be performed automatically by the software as "decisions and actions" 88, such as to automatically order or retrieve more of the wasted material, without user intervention.

A production floor report 84 may be generated automatically at a periodic preset interval, or in response to a crisis situation.

While prior art software may generate reports containing knowledge, for a manager to review, in contrast, the present invention generates firm decisions which merely require managerial approval. Preferably, most actions are automatic.

The software is able to calculate efficient use of material and equipment, and to pinpoint places of weakness to improve future production runs.

Figure 4:
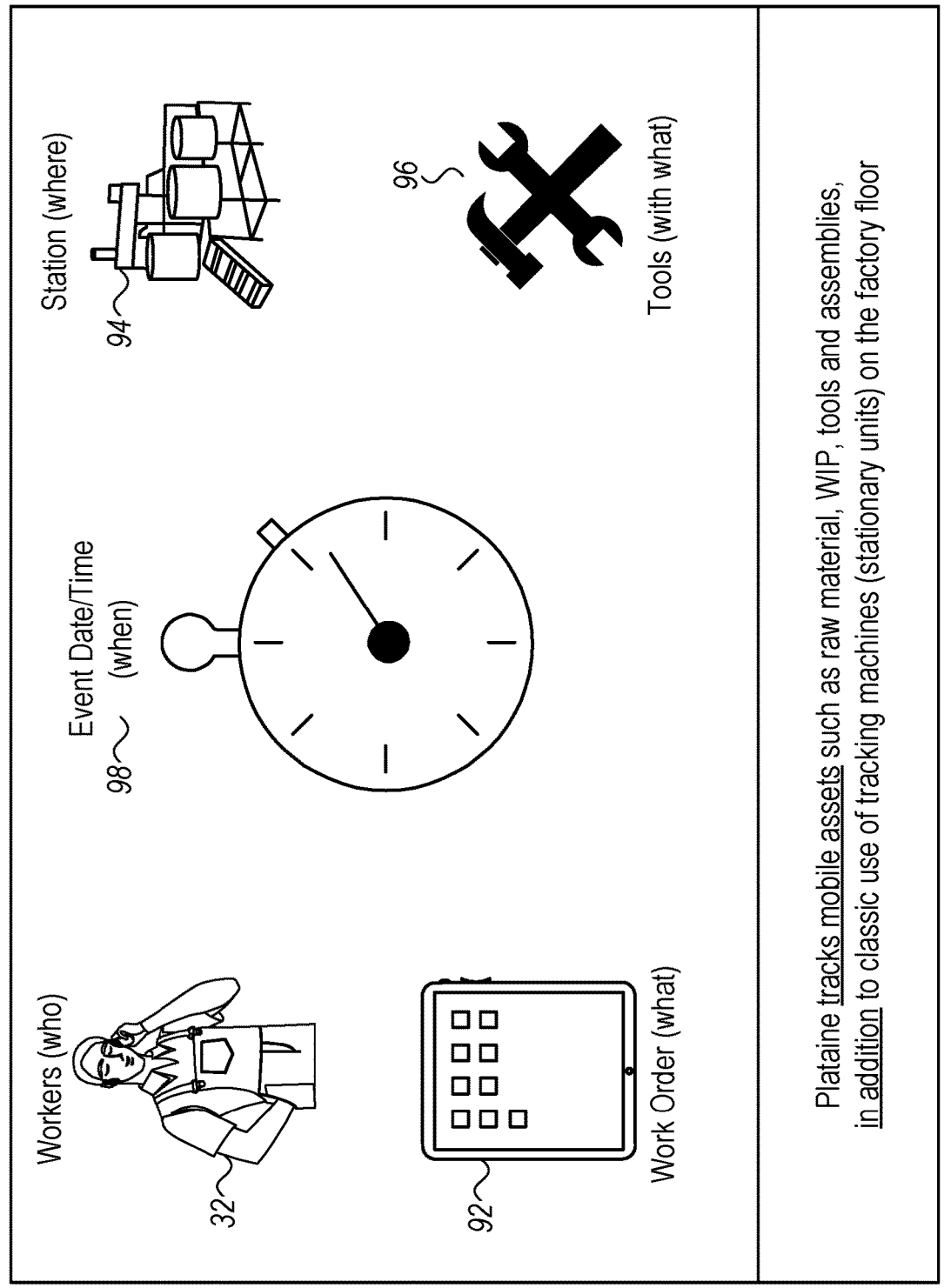
FIG. 4 illustrates assets which may be tracked and assessed using the software of the invention.

Referring now to FIG. 4, the software determines the availability and track the progress of all resources and events at all instances in real time, during planning and production. This includes tracking of location and status of employees 32, work orders 92, production station 94 status, location of central equipment 96. Scheduled production runs 98, are stored in a database, along with details of completed runs, which may be reviewed for efficiency.

Referring back to FIG. 1, in the aircraft industry, a factory may manufacture subassemblies which are combined into structural airplane components (e.g. wings). Numerous rolls 100 of various carbon composite materials (e.g. carbon fiber reinforced polymers [CFRP]) are stored in an industrial freezer 102. Composite materials are also stored as kits 104 which include several pre-cut plies of material.

Each unit of composite material (roll 100 or kit 104), has an expiry date, which is based on the date of manufacture of the physical material.

Additionally, once a roll or kit of material is removed from the freezer for use, this begins an additional countdown termed the ETL (exposure time left), until the material begins to deteriorate if curing is not completed within a set time. If this deadline if not met, the quality of the composite material is compromised, and the material is deemed structurally unsafe for use in aircraft.

The data collector 66 of the software receives constant updates from wall-mounted RFID readers 12 located throughout the facility, as to the location and temperature sensed from the RFID tags 10 fixed to each unit of composite material 100, 104. The software tracks the progress of the composites as they are run through the production line, and is able to generate a report for the final product (e.g. aircraft wing) of which materials were used and when, and what the shelf lives were.

The software calculates a total deadline for completion of the final component being manufactured: If one of the kits 104 to be used has only 10 hours of shelf-life remaining, the entire wing must be completed within 10 hours. This concern is noted by the rule engine 70 component of the software, during planning of the production run. If the deadline is estimated to be unattainable, the decision maker 71 component of the software may divert the unit of material having the shortest shelf-life to another simpler project, to avoid harm to the final product (aircraft wing). Since alerts 28 are generated in advance for short shelf-life materials, the software avoids waste of material as compared to prior art production plans, where the material may be forgotten in the freezer beyond its' expiry date or may be left out too long on the production floor (beyond its ETL). Prior art software does not track the total expiry date for the entire final product as a whole, it merely provides a list of products in storage, including their various expiry dates.

Figure 5:
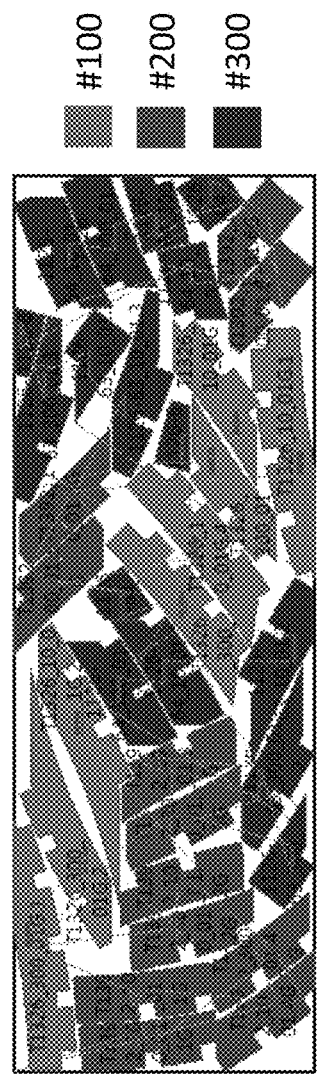
FIG. 5 depicts use of the cut-plan optimizer of the invention.

Referring now to FIG. 5, the software utilizes its cut-plan optimizer 76 to generate a cutting plan with maximal production time-efficiency, and material yield. The optimizer 76 calculates that for three separate jobs (numbered #100, #200 and #300), 160.99" of material would be used. If all 3 jobs would be combined and cut in a single run, only 129.65" of material would be used, a saving of 19.47% in material. An optimal nest combining all three jobs is created. Labor costs are also reduced, since only one production run is performed, even after taking into consideration labor time spent on separating the cut products.

The location and availability of necessary tools (such as lay-up tools T-1000, T-2000 and T-3000), is detected, prior to start of the production run. Tools deemed key assets are RFID tagged, and their availability can be inferred from their location: whether they are currently on the production floor (in use) or are in the warehouse. Maintenance of tools is also tracked via the software and alerts may be issued to ensure timely maintenance occurs. This is in contrast to prior art practice, where a user needed to type in the ID of each tool to check its' location and availability, and schedule its' maintenance. In the present invention, these occur automatically, without the need for constant data entry.

Referring to FIG. 6, components 106a, 106b, 106c are tracked in real-time on the production floor via RFID tags 10 read by wall-mounted RFID readers 12a, 12b, 12c. The context analyzer 68 determines if the parameters (location and temperature) of each component are within acceptable ranges, and issues alerts when required, to specific personnel. For instance, alert 108 has been issued that part "ID 2487" is missing for assembly, and is located in bin "112". In another example, the context analyzer may generate an alert if no data is received about the state of a specific component in use, over a predefined time period, or if the data is not within acceptable logical parameters. This could indicate for instance that the RFID tracker or the RFID reader have become faulty.

Alerts and recommendations may be included in reports issued and may be graded so that significant alerts may be utilized for decisions taken for the next run. For instance, if the context analyzer notes that the "delivery cycle time" is too long, input may be sent to the decision maker to include more preparation time before beginning the production run. If time is wasted between stations, an efficiency alert or recommendation can be generated. If a specific component was not present during assembly, holding up the production until it was located, an alert may be included in the next run to pre-check the location of all items included in an itemized list. Managers may be notified in real time if desirable.

Employees may enter status updates from the production floor at any instance, to indicate for instance, a quality assurance test has failed and the run must be stopped. A report will be outputted, showing details of the run and the failure, and relevant tools may then be tested for reliability. Materials may be reordered if necessary, and cleanup may be ordered. A specific employee or a specific tool may be linked with a recurrent error, and steps may be taken to avoid further recurrence. The software allows rapid tracking of errors and immediate indication of points of weakness, allowing greater efficiency during future runs.

While planning a production job, the decision making software can estimate the cost of materials and labor involved, and generate a bottom line cost, and a decision whether the run is financially advisable according to preset cost rules.

The software may be integrated with external ERP software which includes description of jobs requested. Additionally, PLM software may be integrated with the software of the invention, to allow communication of data pertaining to the engineering specifics of the components to be manufactured.

The software is layered, allowing its integration with existing customer software applications. Customers that already utilize existing applications for collecting data that indicates the status of their production facility, may nevertheless utilize vital components such as the rule engines, decision maker, cutting and tool optimizers, alert issuer, reports, etc.

The software is preferably run on "cloud-based" protected servers which allow authorized users to access it from any location having communications capability. This is useful in the aircraft industry, as assorted components may be manufactured at a multitude of locations. A manager may wish to track progress at any of these locations, and may have access to the availability of precursor materials necessary to manufacture components that are further down the production line. The software may be provided to authorized users, as a software as a service (SaaS), which may be suitable for instance for small production facilities performing relatively few production runs.

The software is flexible, allowing for instance, tracking of a temporary asset or visitor. The software is scalable, allowing reuse of templates (e.g. track location and status of resins, kits, gels), and allowing to add new items for tracking as well.

In summary, the software and system of the invention provide intelligent decision making, which allows tracking of key assets through a production floor, and automatic communication of appropriate decisions if parameters are deemed to be out of acceptable ranges. The invention thus accords users with a tool for highly efficient planning and monitoring of production floors. The software is especially suited for production using materials that are sensitive to the environment, which require constant monitoring during production.

Having described the invention with regard to certain specific embodiments thereof, it is to be understood that the description is not meant as a limitation, as further modifications will now become apparent to those skilled in the art, and it is intended to cover such modifications as are within the scope of the appended claims.

The invention claimed is:

1. A system for deployment in a manufacturing location for monitoring assets used to manufacture a component, each asset comprising a corresponding state indicative of an exposure time left (ETL) of the asset or time until maintenance of the asset for use in the manufacturing of the component, the system comprising:

a plurality of tags, each tag used to monitor at least one condition of a respective asset at the manufacturing location, each tag having a corresponding identifier;

at least one tag reader deployed at the manufacturing location configured to automatically obtain from each tag the condition of the respective asset, and the identifier of the tag;

a database configured to store and associate each identifier with a corresponding asset, to associate the obtained conditions with the corresponding assets, and to store the state of each asset; said database further configured to store a production plan comprising manufacturing conditions associated with said assets;

at least one display device deployed at the manufacturing location and viewable by production personnel at said location; and a processing unit coupled to the database, the at least one tag reader and the at least one display device, the processing unit configured to:

utilize the at least one tag reader to obtain a first identifier and corresponding first condition from at least a first tag from the plurality of tags;

utilize the database to associate the obtained first identifier with a corresponding first asset having a corresponding first state;

update the first state stored in the database for the ETL of the first asset or the time until maintenance of the first asset, based upon the first condition obtained from the first tag;

utilize the updated first state to determine and display on the at least one display device information prioritizing which assets to use to manufacture the component or which assets to maintain; and determine whether said first condition is in accordance with said production plan.

2. The system of claim 1, wherein the at least one condition comprises one or more of temperature, pressure, humidity, and location.

3. The system of claim 2, wherein the first tag monitors a temperature of the first asset or of the environment of the first asset, the processing unit updates the ETL based upon at least the measured temperature, and the information prioritizing which assets to use includes the ETL.

4. The system of claim 2, wherein for the first asset the first state further comprises tool availability, the first tag is used to monitor the location of the first asset, the processing unit updates the tool availability based upon the location of the first asset, and the information prioritizing which assets to use includes a tool to use based upon the tool availability.

5. The system of claim 4, wherein the processing unit is further configured to manage the respective time until maintenance of at least some of the assets based upon usage of the at least some of the assets, the usage based at least upon respective tool availabilities of the assets, and the information prioritizing which assets to use includes an indication of which of the at least some of the assets should be serviced.

6. The system of claim 2, wherein the first state of the first asset further comprises a location of the first asset, and the processing unit is further configured to:

utilize the at least one tag reader to obtain the location of the first asset; and update the first state based upon the location of the first asset.

7. The system of claim 1, wherein the processing unit is further configured to update the states stored in the database of at least a portion of the assets based upon corresponding expiration dates or times of the at least a portion of the assets.

8. The system of claim 1, wherein each tag is at least one of a passive RFID tag, an active RFID tag, a battery-assisted RFID tag, a near field communication tag, and a barcode.

9. The system of claim 1, wherein the processing unit is further configured to store the first condition obtained from the first tag in the database.

10. The system of claim 1, wherein the information prioritizing which assets to use includes a production alert for the first asset based upon the updated first state.

11. The system of claim 1, wherein the processing unit is further configured to schedule which assets to use to manufacture the component based upon the current states of the assets stored in the database and to indicate on the display which assets to use based upon the schedule.

12. The system of claim 1, wherein the database is further used to store a production plan comprising production information related to the first asset, and the processing unit is configured to:

determine whether the first condition conforms with the production information;

send a production alert indicating that the first condition does not conform with the production information of said production plan.

13. The system of claim 12, wherein for the production information comprises at least one of a predetermined location, a predetermined temperature, a predetermined humidity, a predetermined pressure, and expiration date or time.

14. The system of claim 12 wherein the production alert is at least one of an alert for temperature out of acceptable range, an alert for an asset in improper location, an alert for equipment failure, an alert of efficiency below a predefined expected value, an alert for equipment unavailable, an alert for detection of a link between a failed production run and a specific employee or a specific tool, and an alert that a job is financially inadvisable to be performed.

15. The system of claim 12, wherein the production alert is further used by the system as input data for improving efficiency of a future production run.

16. The system of claim 1, further comprising an optimizer component for calculating and scheduling efficient use of central production stations and of materials, and the information prioritizing which assets to use includes a production floor plan schedule for a planned job run.

17. The system of claim 16, wherein said optimizer comprises one or more of a cutting plan optimize for planning initial cutting of material, a material-selection optimizer for selecting the optimal material from storage, an assembly optimizer for detecting optimal parameters of organizing an assembly, and a tool optimizer for planning most efficient use of equipment.

18. The system of claim 1, wherein said first asset is a raw material, and the first state further comprises at least one of a size of the raw material, a weight of the raw material, an expiration date of the raw material, and a temperature of the raw material.

19. The system of claim 18, wherein the raw material is one of a carbon fiber reinforced polymer material, a resin, a metal-powder, a container, and a material used in production.

20. The system of claim 1, wherein the database is further configured to store a production recommendation related to the first asset, the production recommendation including at least one of: a recommendation to order a material, a recommendation to use a specific unit of material, a recommendation for maintenance due, and a recommendation to halt a failed production run, and the processing unit is further configured to update the production recommendation based upon at least the first condition and display the updated production recommendation on the display device.

21. The system of claim 20, wherein the production recommendation is used by the system as input data for improving efficiency of a future production run.

22. The system of claim 1, further comprising a context analyzer, comprising: a rule engine and a decision making component.

23. A server for monitoring assets at a manufacturing location, the assets used to manufacture a component, each asset comprising a corresponding state indicative of an exposure time left (ETL) of the asset or time until maintenance of the asset for use in the manufacturing of the component, the server comprising:
    an input interface configured to communicate with a tag reader deployed at the manufacturing location to automatically obtain from each of a plurality of tags a condition of a respective asset at the manufacturing location corresponding to the tag and to receive a respective identifier of each tag;
    a database configured to store and associate each identifier with a corresponding asset, to associate the obtained conditions with the corresponding assets, and to store the state of each asset; said database further configured to store a production plan comprising manufacturing conditions associated with said assets;
    an output interface for coupling to at least one display device deployed at the manufacturing location for production personnel; and
    a processing unit coupled to the database, the at least one tag reader and the output interface, the processing unit configured to:
        utilize the input interface to obtain a first identifier and corresponding first condition from at least a first tag from the plurality of tags;
        utilize the database to associate the obtained first identifier with a corresponding first asset having a corresponding first state;
        update the first state stored in the database for the ETL of the first asset or the time until maintenance of the first asset, based upon the first condition obtained from the first tag; and
        utilize the output interface and the updated first state to determine and display on the at least one display device:
            information prioritizing which asset to use to manufacture the component or which assets to maintain; and information comprising a determination whether said first condition is in accordance with said production plan.

24. The server of claim 23, wherein the at least one condition comprises one or more of temperature, pressure, humidity, and location.

25. The server of claim 24, wherein the first tag monitors a temperature of the first asset or of the environment of the first asset, the processing unit updates the ETL based upon at least the measured temperature, and the information prioritizing which assets to use includes the ETL.

26. The server of claim 24, wherein for the first asset the first state further comprises tool availability, the first tag is used to monitor the location of the first asset, the processing unit updates the tool availability based upon the location of the first asset, and the information prioritizing which assets to use includes a tool to use based upon the tool availability.

27. The server of claim 26, wherein the processing unit is further configured to manage the respective time until maintenance of at least some of the assets based upon usage of the at least some of the assets, the usage based at least upon respective tool availabilities of the assets, and the information prioritizing which assets to use includes an indication of which of the at least some of the assets should be serviced.

28. The server of claim 24, wherein the first state of the first asset further comprises a location of the first asset, and the processing unit is further configured to:
    utilize the at least one tag reader to obtain the location of the first asset; and
    update the first state based upon the location of the first asset.

29. The server of claim 23, wherein the processing unit is further configured to update the respective states stored in the database of at least a portion of the assets based upon corresponding expiration dates or times of the assets.

30. The server of claim 23, wherein each tag is at least one of a passive RFID tag, an active RFID tag, a battery-assisted RFID tag, a near field communication tag, and a barcode.

31. The server of claim 23, wherein the processing unit is further configured to store the first condition obtained from the first tag in the database.

32. The server of claim 23, wherein the information prioritizing which assets to use includes a production alert for the first asset based upon the updated first state.

33. The server of claim 23, wherein the database is further used to store a production plan comprising production information related to the first asset, and the processing unit is further configured to:
    determine whether the first condition conforms with the production information;
    wherein the information prioritizing which assets to use includes a production alert indicating that the first condition does not conform with the production information.

34. The server of claim 33, wherein for the production information comprises at least one of a predetermined location, a predetermined temperature, a predetermined humidity, a predetermined pressure, and expiration date or time.

35. The server of claim 33 wherein the production alert is at least one of an alert for temperature out of acceptable range, an alert for an asset in improper location, an alert for equipment failure, an alert of efficiency below a predefined expected value, an alert for equipment unavailable, an alert for detection of a link between a failed production run and a specific employee or a specific tool, and an alert that a job is financially inadvisable to be performed.

36. The server of claim 33, wherein the production alert is further used by the server as input data for improving efficiency of a future production run.

37. The server of claim 23, further comprising an optimizer component for calculating and scheduling efficient use of central production stations and of materials, and the information prioritizing which assets to use includes a production floor plan schedule for a planned job run.

38. The server of claim 37, wherein said optimizer comprises one or more of a cutting plan optimize for planning initial cutting of material, a material-selection optimizer for selecting the optimal material from storage, an assembly optimizer for detecting optimal parameters of organizing an assembly, and a tool optimizer for planning most efficient use of equipment.

39. The server of claim 23, wherein said first asset is a raw material, and the first state further comprises at least one of a size of the raw material, a weight of the raw material, an expiration date of the raw material, and a temperature of the raw material.

40. The server of claim 39, wherein the raw material is one of a carbon fiber reinforced polymer material, a resin, a metal-powder, a container, and a material used in production.

41. The server of claim 23, wherein the database is further configured to store a production recommendation related to the first asset, the production recommendation including at least one of a recommendation to order a material, a recommendation to use a specific unit of material, a recommendation for maintenance due, and a recommendation to halt a failed production run, and the processing unit is further configured to update the production recommendation based upon at least the first condition and display the updated production recommendation on the display device.

42. The server of claim 41, wherein the production recommendation is used by the system as input data for improving efficiency of a future production run.

43. The server of claim 23, further comprising a rule engine and a decision making component.

* * * * *